US008875094B2

(12) United States Patent
Kalyanasundaram

(10) Patent No.: US 8,875,094 B2
(45) Date of Patent: Oct. 28, 2014

(54) SYSTEM AND METHOD FOR IMPLEMENTING INTELLIGENT JAVA SERVER FACES (JSF) COMPOSITE COMPONENT GENERATION

(75) Inventor: Anand Kumar Kalyanasundaram, Chennai (IN)

(73) Assignee: Oracle International Corporation, Redwood Shores, CA (US)

( * ) Notice: Subject to any disclaimer, the term of this patent is extended or adjusted under 35 U.S.C. 154(b) by 632 days.

(21) Appl. No.: 13/232,217

(22) Filed: Sep. 14, 2011

(65) Prior Publication Data

US 2013/0067317 A1      Mar. 14, 2013

(51) Int. Cl.
*G06F 9/44*      (2006.01)
(52) U.S. Cl.
CPC .......................... *G06F 8/24* (2013.01)
USPC ............................ 717/107; 717/108; 717/120
(58) Field of Classification Search
None
See application file for complete search history.

(56) References Cited

U.S. PATENT DOCUMENTS

| | | | |
|---|---|---|---|
| 6,966,050 | B2 | 11/2005 | Watase et al. |
| 7,246,134 | B1 * | 7/2007 | Kitain et al. ........................ 1/1 |
| 7,325,189 | B2 * | 1/2008 | Kurumai et al. ............. 715/234 |
| 7,617,482 | B2 | 11/2009 | Wang et al. |
| 7,634,721 | B1 | 12/2009 | Labrecque |
| 2005/0160358 | A1 * | 7/2005 | Gumz et al. ................... 715/513 |
| 2008/0235661 | A1 | 9/2008 | Arpana et al. |
| 2009/0254837 | A1 | 10/2009 | Dybdahl et al. |

OTHER PUBLICATIONS

Ferko, "Create a JSF component to work with map servers," 2011.*
Author Unknown, "JSF 2.0 Support in NetBeans IDE," NetBeans, 2011, accessed Mar. 23, 2011, netbeans.org/kb/docs/web/jsf20-support.html.
Author Unknown, "JSF2 of the template and composite components," CodeWeblog.com, 2011, accessed Mar. 23, 2011, www.codeweblog.com/jsf2-of-the-template-and-composite-components/.
Geary, "JSF 2 fu: Ajax components—Implement reusable, Ajaxified components with JSF 2," developerWorks, Apr. 27, 2010, accessed Mar. 23, 2011, www.ibm.com/developerworks/web/library/j-jsf2fu-0410/index.html?ca=drs-.
Sangeetha, et al., "JSF 2.0: Creating Composite Components," Developer.com, Mar. 8, 2010, accessed Mar. 23, 2011, www.developer.com/java/web/article.php/3869281/JSF-20-Creating-Composite-Components.htm.

* cited by examiner

*Primary Examiner* — Lewis A Bullock, Jr.
*Assistant Examiner* — Christine Dang
(74) *Attorney, Agent, or Firm* — Kilpatrick Townsend & Stockton LLP

(57) ABSTRACT

One embodiment of the invention describes a method of generating intelligent Java server faces (JSF) composite components. The method includes identifying at least one facelet file within a project, creating a node tree from the at least one facelet file, iterating through the node tree to determine which nodes are tags for composite components, and in response to determining that a plurality of nodes are tags for composite components, computing a hash for each of the plurality of nodes. The method further includes generating node lists for each of the plurality of nodes, adding the plurality of nodes and the hashes to corresponding node lists, comparing each node list against every other node list, and in response to determining a match among node lists, saving the matched node lists as composite components.

20 Claims, 11 Drawing Sheets login.jspx
...
```
<af:spacer width="10" height="10" id="s1"/>
<af:panelGroupLayout layout="horizontal" id="pgl2">
<af:outputLabel value="Please Log In"
    inlineStyle="color:blue; font-size:medium;"
    id="ol5"/>
<af:spacer width="10" height="10" id="s2"/>
<f:verbatim>
<![CDATA[
<form name="loginForm" method="post" action="j_security_check">
<table><tr><td align="right">Username : <input tabindex="1" type="text"
name="j_username" onblur="document.loginForm.j_password.focus();"/></td></tr>
<tr><td align="right">Password : <input type="password" name="j_password"
onblur="document.loginForm.j_username.focus();"/></td></tr>
<tr><td><input type="submit" value="Login" /></td></tr></table>
</form>
]]>
</f:verbatim>
```
...

login_error.jspx
....
```
<f:facet name="main_content">
<af:panelGroupLayout layout="horizontal" id="pgl12">
<af:outputLabel value="Please Log In"
    inlineStyle="color:blue; font-size:medium;"
    id="ol1"/>
<af:spacer width="10" height="10" id="s3"/>
<f:verbatim>
<![CDATA[
<form name="loginForm" method="post" action="j_security_check">
<table><tr><td align="right">Username : <input tabindex="1" type="text"
name="j_username" onblur="document.loginForm.j_password.focus();"/></td></tr>
<tr><td align="right">Password : <input type="password" name="j_password"
onblur="document.loginForm.j_username.focus();"/></td></tr>
<tr><td><input type="submit" value="Login" /></td></tr></table>
</form>
]]>
</f:verbatim>
```
...

session_expired.jspx

Fig. 3A

```
....
<af:panelGroupLayout layout="horizontal" id="pgl1">
    <af:outputLabel value="Please Log In"
        inlineStyle="color:blue; font-size:medium;"
        id="ol2"/>
    <af:spacer width="10" height="10" id="s15"/>
    <f:verbatim>
    <![CDATA[
    <form name="loginForm" method="post" action="j_security_check">
    <table><tr><td align="right">Username : <input tabindex="1" type="text"
name="j_username" onblur="document.loginForm.j_password.focus();"/></td></tr>
    <tr><td align="right">Password : <input type="password"
name="j_password" onblur="document.loginForm.j_username.focus();"/></td></tr>
    <tr><td><input type="submit" value="Login" /></td></tr></table>
    </form>
    ]]>
    </f:verbatim>
....
```

The common part:
```
<af:outputLabel value="Please Log In"
    inlineStyle="color:blue; font-size:medium;"
    id="ol1"/>
<af:spacer width="10" height="10" id="s3"/>
<f:verbatim>
<![CDATA[
<form name="loginForm" method="post" action="j_security_check">
<table><tr><td align="right">Username : <input tabindex="1" type="text"
name="j_username" onblur="document.loginForm.j_password.focus();"/></td></tr>
<tr><td align="right">Password : <input type="password"
name="j_password" onblur="document.loginForm.j_username.focus();"/></td></tr>
<tr><td><input type="submit" value="Login" /></td></tr></table>
</form>
]]>
</f:verbatim>
```

Fig. 3B

```
Embedded scripts:
        home.jspx
           ...
    <trh:script id="script21">
      function showDetails(e)
              {
          var im = e.getSource();
var popup = AdfPage.PAGE.findComponent("movieDetail");

popup.show(hints);
              } function hideDetails(e)
              {
var popup = AdfPage.PAGE.findComponent("movieDetail");
          popup.hide();
              }
         </trh:script>
         <af:popup ...>
           ...

checkout.jspx
           ...
    <trh:script id="script05">
      function showDetails(e)
              {
          var im = e.getSource();
var popup = AdfPage.PAGE.findComponent("movieDetail");

popup.show(hints);
              } function hideDetails(e)
              {
var popup = AdfPage.PAGE.findComponent("movieDetail");
          popup.hide();
              }
         </trh:script>
         <af:popup ...>
           ...
```

Fig. 4

SYSTEM AND METHOD FOR IMPLEMENTING INTELLIGENT JAVA SERVER FACES (JSF) COMPOSITE COMPONENT GENERATION

BACKGROUND

Currently, Java Server Faces (JSF) include a feature which provides for generating composite components. JSF uses XML files called view templates or Facelets views, and requests are processed by the FacesServlet, which loads the appropriate view template, builds a component tree, processes events, and renders the response (typically in HTML) to a client. This allows users to use a template code in a tag library (takes parameters) in the Facelet pages. The current process is that the user must first create the tag library (which must be designed beforehand) and then create the actual pages that would be used in the tag library.

As such, if generating of composite components is desired without a tag library being created, then it is currently not possible to create composite components using JSF. Current solutions require users to pre-design composite components, and many web applications are created by moving page parts from a prototype and/or by a significant amount of cutting and pasting. Accordingly, cleanup of applications created in this way needs to be simplified (i.e., duplicate page parts are removed) and maintainable. Hence, for these and other reasons, improvements are needed in the art.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIGS. 3A and 3B illustrate an output example associated with intelligent JSF composite component generation, in accordance with one embodiment of the present invention.

FIG. 4 illustrates an output example, in accordance with another embodiment of the present invention.

SUMMARY OF THE INVENTION

Figure 1A:
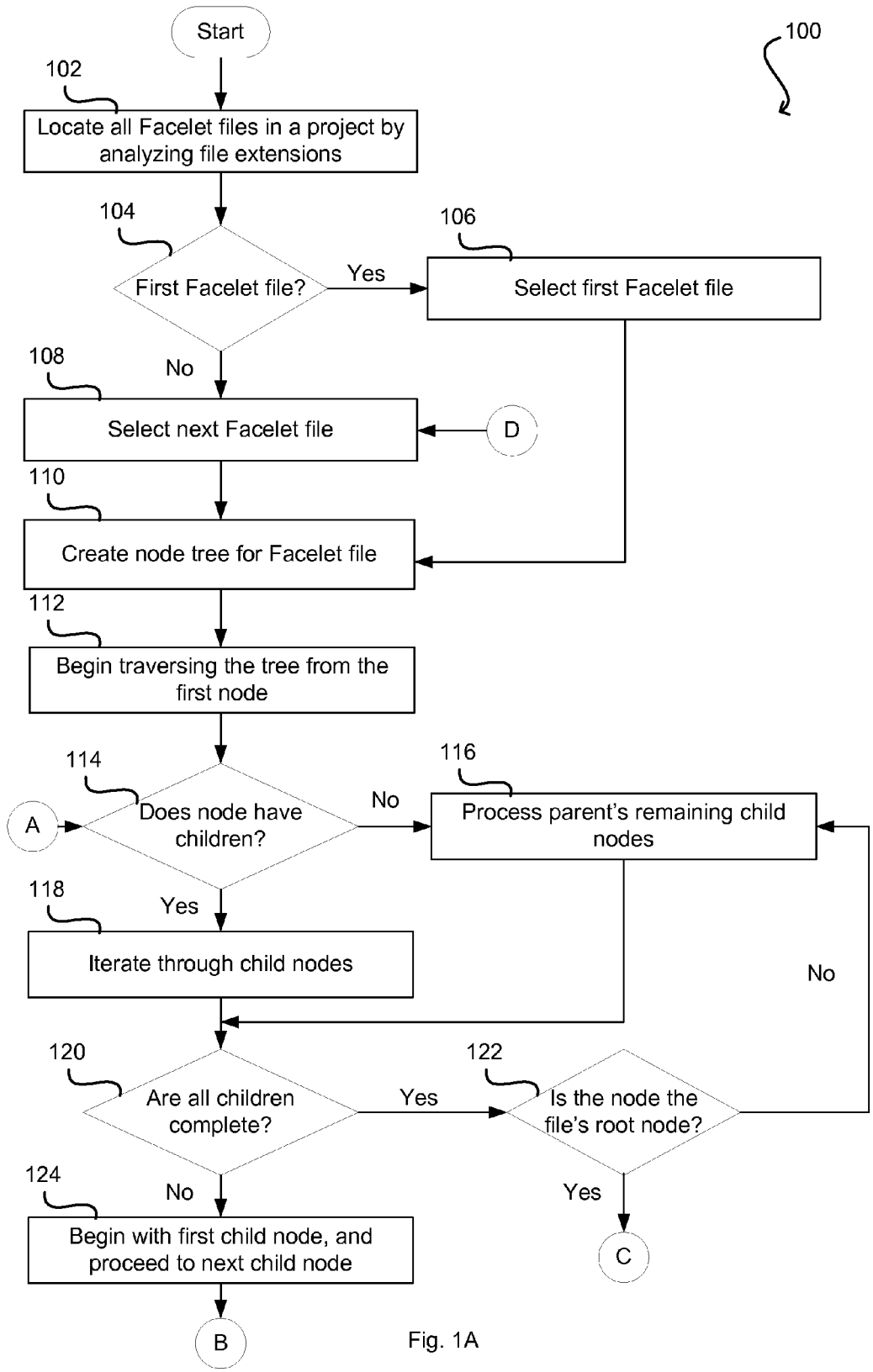
FIGS. 1A-1E illustrate a method of implementing intelligent Java server faces (JSF) composite component generation, according to embodiments of the present invention.

One embodiment of the invention describes a method of generating intelligent Java server faces (JSF) composite components. The method includes identifying at least one facelet file within a project, creating a node tree from the at least one facelet file, iterating through the node tree to determine which nodes are tags for composite components, and in response to determining that a plurality of nodes are tags for composite components, computing a hash for each of the plurality of nodes. The method further includes generating node lists for each of the plurality of nodes, adding the plurality of nodes and the hashes to corresponding node lists, comparing each node list against every other node list, and in response to determining a match among node lists, saving the matched node lists as composite components.

Further, the identifying of the at least one facelet file within the project includes analyzing file extensions associated with the at least one facelet file. The method further includes saving node lists to a data structure, removing duplicate entries in the data structure, requesting a review of the node lists to determine which node lists are to be converted to composite components, and receiving a selection of the list nodes to be converted to composite components. Furthermore, the method includes converting the selected list nodes to composite components. The conversion occurs after the at least one facelet file has been created.

In a further embodiment, a system for generating JSF composite components, is described. The system includes a storage device having sets of instructions stored thereon, and a processor coupled with the storage device. The sets of instructions when executed by the processor, cause the processor to identify at least one facelet file within a project, create a node tree from the at least one facelet file, iterate through the node tree to determine which nodes are tags for composite components, and in response to determining that a plurality of node are a tags for a composite components, compute a hash for each of the plurality of nodes. The set of instructions further cause the processor to generate node lists for each of the plurality of nodes, add the plurality of nodes and the hashes to the corresponding node lists, compare each the node list against every other node list. and in response to determining a match among node lists, save the matched node lists as composite components.

Furthermore, the sets of instructions cause the processor to create a node tree structure for the at least one facelet file, generate child nodes within the node tree structure for each segment in the facelet file, create a new tag library, update an existing tag library, and add a tag to the tag library and create composite component files from the node lists and add the composite component files to the tag within the tag library. Further, the sets of instructions cause the processor to determine that at least one node list includes only one entry, and in response to determining that the at least one node list only includes one entry, delete the at least one node list.

In yet another embodiment, a computer-readable medium is described. The computer-readable medium has sets of instructions stored thereon, which when execute by a computer, cause the computer to identify at least one facelet file within a project, create a node tree from the at least one facelet file, iterate through the node tree to determine which nodes are tags for composite components, and in response to determining that a plurality of nodes are tags for composite components, compute a hash for each of the plurality of nodes. The sets of instructions further cause the computer to generate node lists for each of the plurality of nodes, add the plurality of nodes and the hashes to the corresponding node lists, compare each node list against every other node list, and in response to determining a match among node lists, save the matched node lists as composite components.

Furthermore, the sets of instructions cause the computer to save node lists to a data structure, remove duplicate entries in the data structure, request a review of the node lists to determine which node lists are to be converted to composite components, and receive a selection of the node lists to be converted to composite components.

Further, the sets of instructions cause the computer to convert the selected node lists to composite components, create a new tag library, and add a tag to the tag library and create composite component files from the node lists and add the composite component files to the tag within the tag library. The conversion occurs after the at least one facelet file has been created.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention relate to allowing a user to select a part of their current facelets page and convert the page into a tag library composite component. This provides a practical approach as compared to initially designing the composite component library. Aspects of this invention will provide for creating a new tag library (or updating an existing tag library) and adding the tag and creating the composite component file.

Furthermore, if the user already has a number of facelets pages, then a feature (i.e., generate a composite component library for a project) would parse through each of the facelets pages within the project to identify repetitive facelets page segments. The list may then be provided to the user along with current references for each composite component listed. The user can then decide which facelets page segments should be converted to composite components. For each selection of the project, these steps may be performed.

Turning now to FIG. 1A, a method 100 of implementing intelligent Java server faces (JSF) composite component generation, in accordance with embodiments of the present invention is illustrated. At process block 102, all facelet files may be located within a project. In one embodiment, a project is a software development project implemented in XML and the Java programming languages. The facelet files are segments of the project as programmed.

At process block 104, a determination is made whether a selected facelet file is the first facelet file to be selected. If it is determined to be the first facelet file selected, then the first facelet file is selected (process block 106); otherwise, the next available facelet file is selected (process block 108).

Furthermore, at process block 110, a node tree structure is created for the selected facelet file. The node tree structure may include a plurality of nodes representing each of the segments of the facelet file. The segments may represent distinctive code segments within the facelet file which may be identified as candidates for composite components.

The node tree structure is then traversed (process block 112), and a determination is made whether the current node of the node tree structure has a child node (decision block 114). If the current node is determined to have a child node structure, then the process iterates through the child nodes (process block 118). Otherwise, at process block 116, the parent's remaining child nodes are processed.

At decision block 120, it is determined if all child nodes have been processed. If all child nodes have been processed, then at decision block 122, it is determined if the current node is the facelet file's root node. If the current node is not the facelet files' root node, then the process moves back to process block 116, to continue processing the remaining child nodes of the parent node.

Alternatively, if it is determined that the current node is the facelet files' root node, then the process continues to point 'C'. Further, if at decision block 120, it is determined that not all child nodes of the current node are complete, then at process block 124, processing begins with the first child node and continues to the next child node, until all child nodes have been processed. Then, the process continues to point 'B'.

Figure 1B:
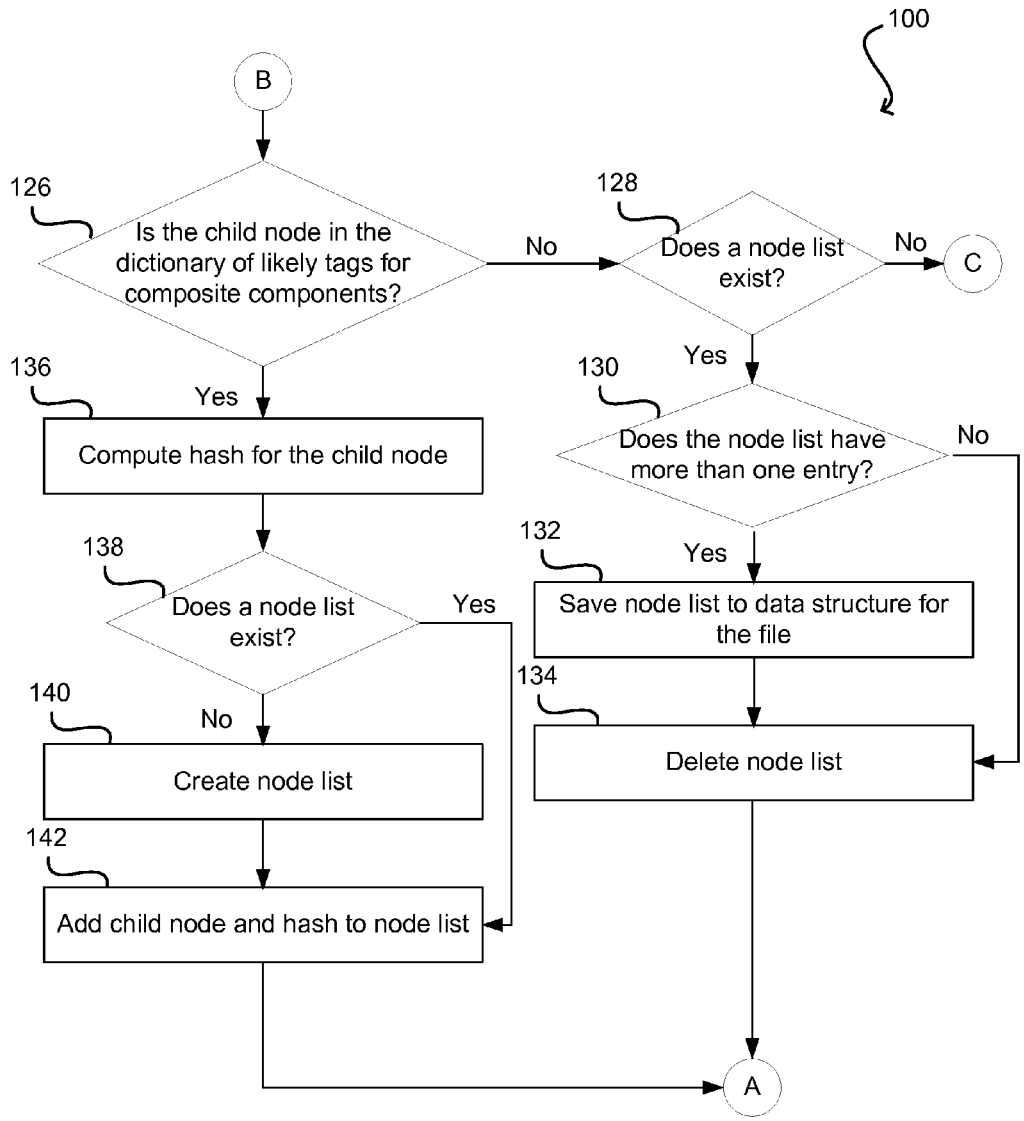

Turning now to FIG. 1B, continuing at point 'B', at decision block 126, a determination is made whether the current child node is in the dictionary of likely tags for composite components. In one embodiment, the dictionary of likely tags for composite components may include code segments which have been flagged as potential candidates for composite components based on one or more criteria. Furthermore, the criteria may include key phrases, etc. In one embodiment, the dictionary for the feasibility implementation may be composed of text, labels, buttons, spacer tags, etc. This dictionary could be expanded to include layout tags and other remaining user interface form element tags. A set of form elements with layout information may be, for example, an ideal candidate for a composite component.

If it is determined that the current child node is in the dictionary of likely tags for composite components, then at process block 136, a hash for the current child node is computed. In one embodiment, the attributes and attribute values (excluding the ID attribute) are captured in order to generate the hash for the child node. Accordingly, a determination is made whether a node list for the current child node already exists (process block 138).

If no node list for the current child node exists, then at process block 140, the node list for the current child node is created. If a node list for the current child node exists, then at process block 142, the child node and hash are added to the node list. Then, the process continues to point 'A' to determine if the current node has additional children (decision block 120).

Figure 1C:
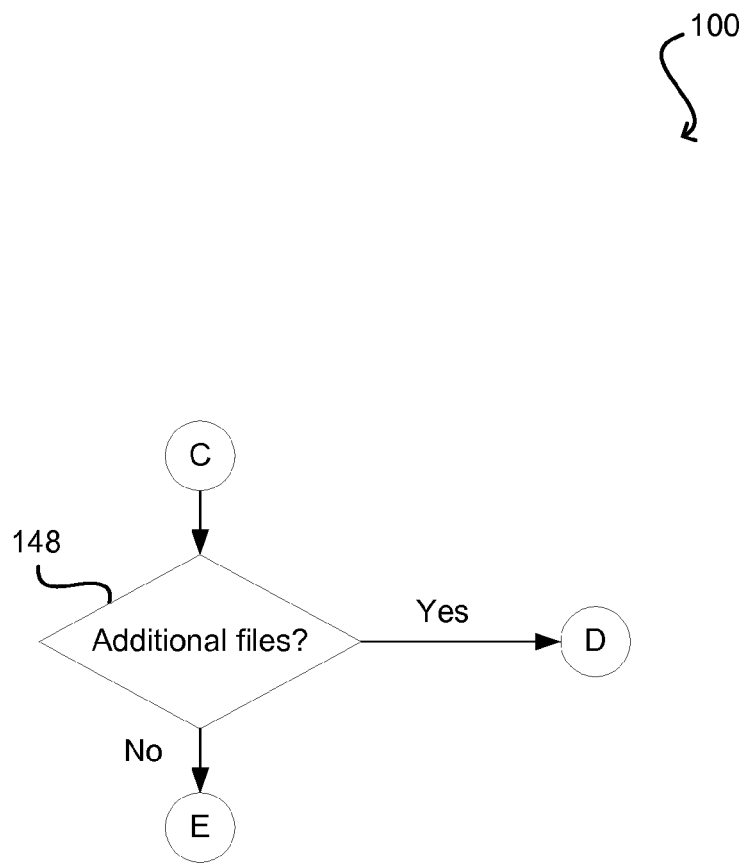
Figure 1D:
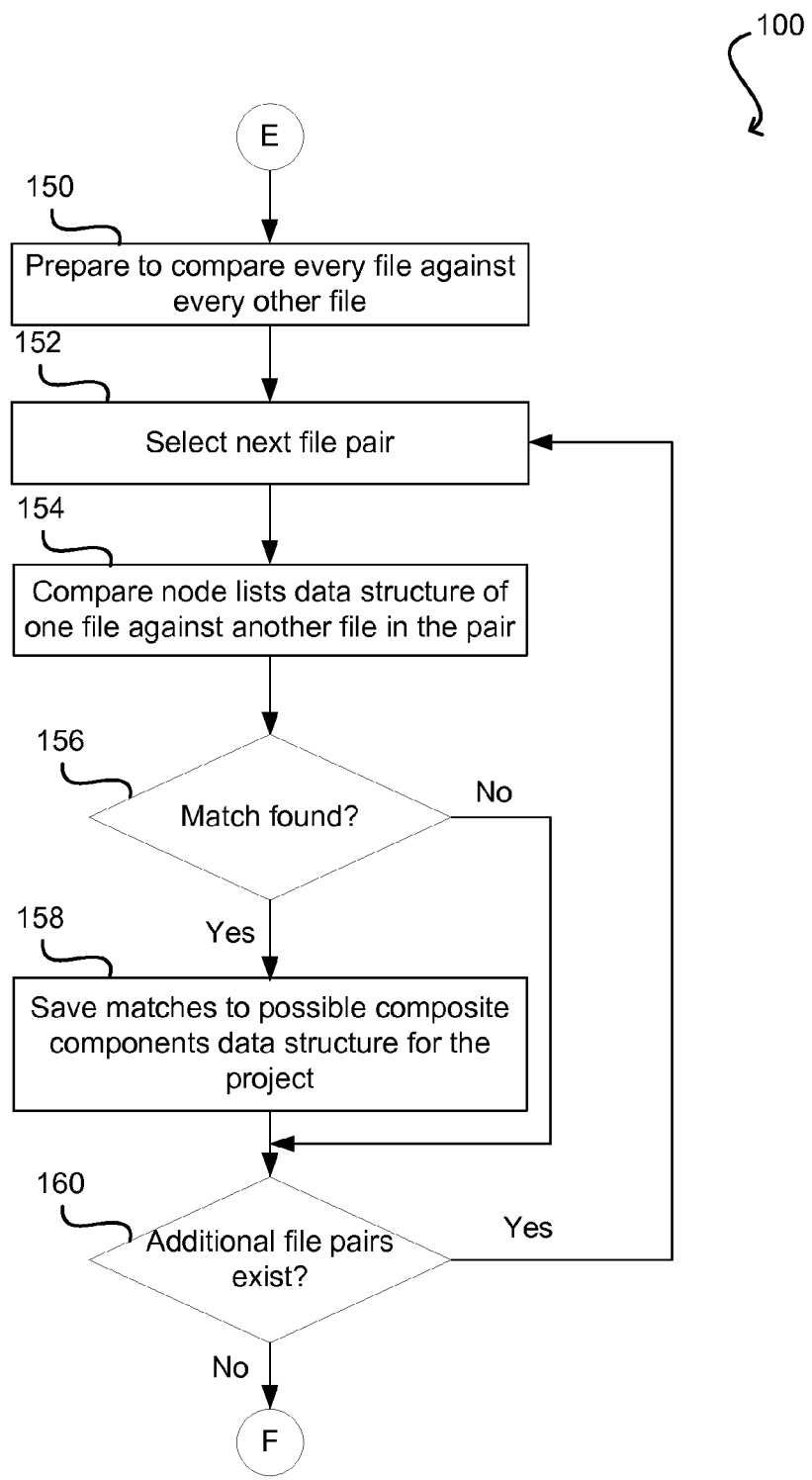

Referring back to decision block 126, if it is determined that the current child node is not in the dictionary of likely tags for composite components, then at decision block 128, a determination is made whether a node list exists. Accordingly, if no node list exists, then the process proceeds to point 'C', at FIG. 1C, to determine if there are additional facelet files within the project (decision block 148).

If it is determined that a node list exists, then at decision block 130, a determination is made whether the node list includes more than one entry. If the node list includes more than one entry (i.e., there are possible composite components to be compared), then the node list is saved to the data structure for the facelet file (process block 132). Then, at process block 134, the node list is deleted. However, if it is determined that only one entry exists in the node list, then the node list is deleted (process block 134), without being saved to the data structure. Then, the process continues to point 'A', to determine if the current node has additional children (decision block 120).

Referring back to FIG. 1C, at process block 148 the determination is made if there are additional facelet files within the project. If it is determined that there are additional facelet files within the project, then the process moves from point 'D' to process block 108 where the next facelet in the project is selected. Accordingly, the aforementioned process is repeated, as described above.

Otherwise, if it is determined that additional facelet files do not exist within the project, then the process continues from point 'E' to process block 150. At process block 150, preparations are made to compare every facelet file against each of the other facelet files within the project. The comparisons may be performed by comparing pairs of facelet files. As such, at process block 152 a pair of facelet files is selected.

At process block 154 the node list data structures of one facelet file are compared against the node list data structures of the other facelet file in the pair (i.e., a list and list subset comparison). A determination is then made if a match within the node lists is found at decision block 156). If a match is found, then at process block 158 the match is saved to a composite component data structure for the project as a possible composite component. If no match is found, then the process continues to decision block 160.

Figure 1E:
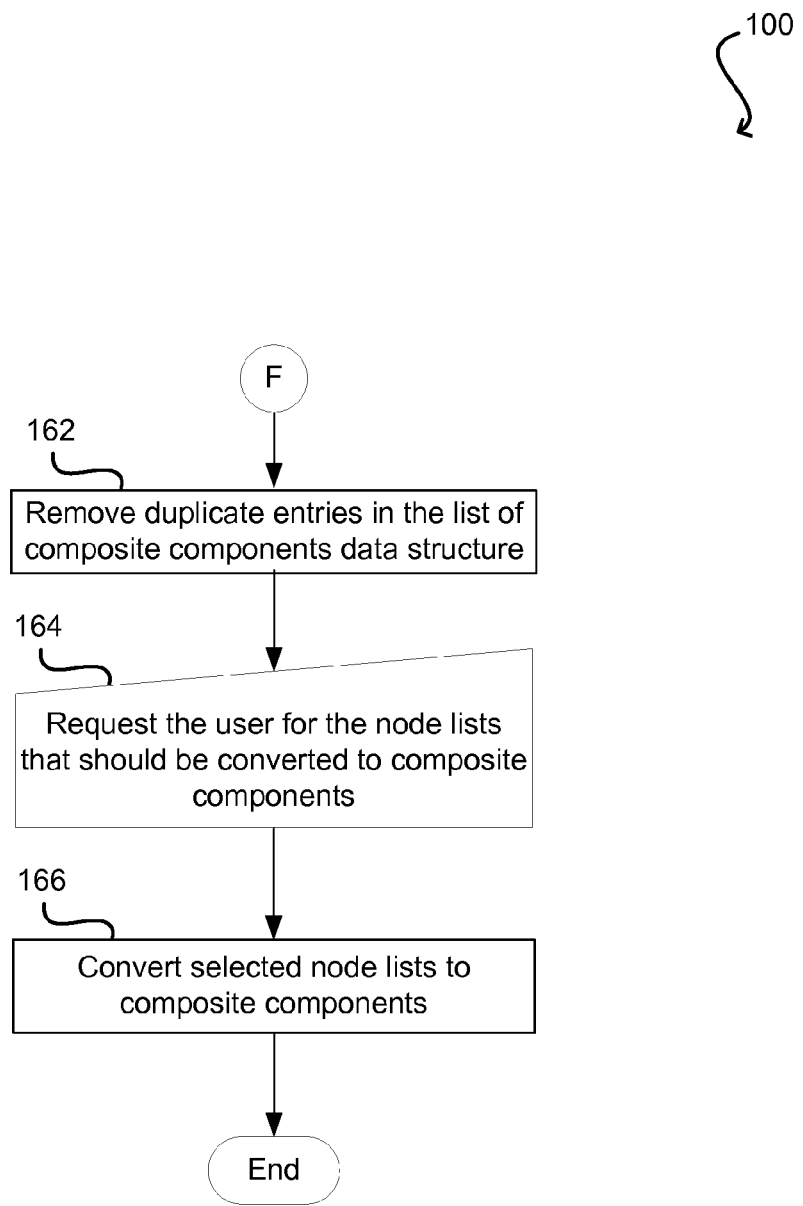

At decision block 160 a determination is made whether there are additional pairs. If there are additional pairs, then the next pair is selected (process block 152), and comparisons of the pair are made (process block 154), and so forth (as described above). If there are no additional pairs, then the process continues from point 'F' to FIG. 1E at process block 162.

At process block 162 duplicate entries within the list of composite component data structures are removed. Then, at input block 164, the user is requested to review the node lists to indicate which of the node lists should be converted to composite components. In one embodiment, the node lists may be presented in a user interface with as much or as little detail as requested by the user within user preferences. As such, once the indications of which node list is to be converted into composite components is received, the selected node list is converted into composite components (process block 166).

Therefore, the composite components are now available for future use and reuse in other projects. Furthermore, the newly created composite components may also be compared against future node lists to determine if a composite component for the node list has already been created, thus avoiding duplication of work and processing resources.

Figure 2:
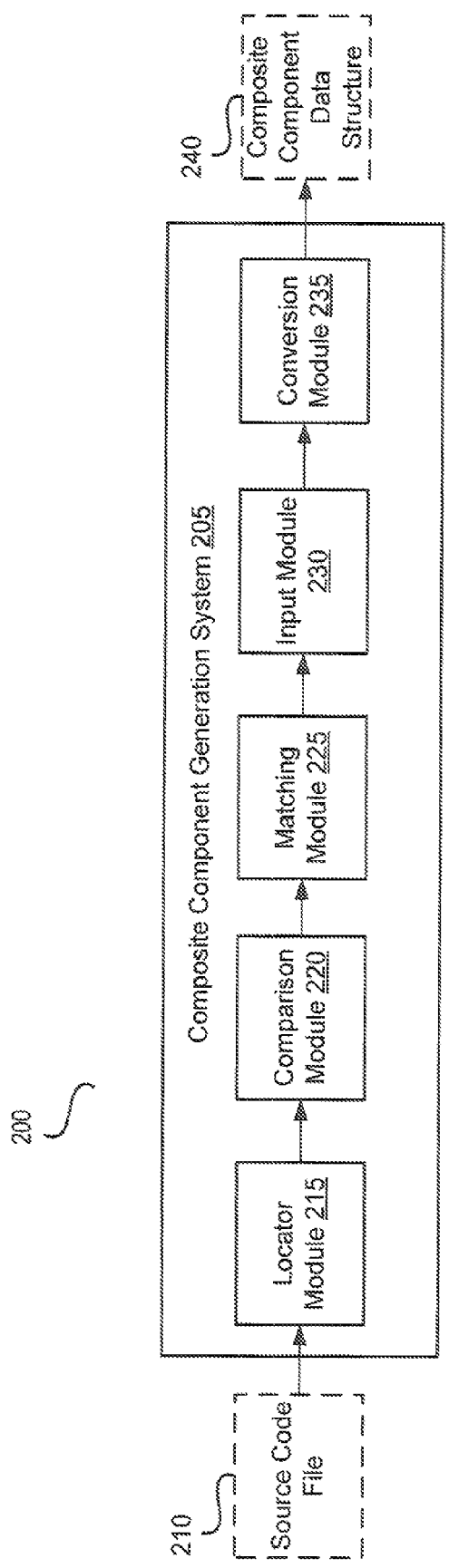
FIG. 2 illustrates a system for implementing intelligent JSF composite component generation, according to another embodiment of the present invention.

Turning now to FIG. 2, a system 200 for generating composite components is illustrated. The system 200 includes a composite component generation system 205 in communication with a source code file 210 and a composite component data structure 240. In one embodiment, the source code file 210 may include multiple facelet files for a project.

The composite component generation system 205 includes a locator module 215 which receives the source code file 210 and locates all of the included facelet files. Then, all of the facelet files are compared to each of the other located facelet files using the comparison module 220. Further, the matching module 225 determines which of the facelet files match among the identified facelet files. In one embodiment, the facelet files are deconstructed into a node tree structure with a number of node lists representing prospective composite components.

Furthermore, input module 230 receives user input indicating which of the node lists within the facelet files are to be converted into composite components. Accordingly, the conversion module 235 converts the selected node list into composite components and output a composite component data structure 240. Further, it should be noted that system 200 may be used to implement any aspect of method 100, as described above in FIGS. 1A-1E.

Referring next to FIGS. 3A and 3B, an output example associated with intelligent JSF composite component generation is illustrated. This example would be detected as a candidate to be converted into a composite component. Furthermore, FIG. 4 illustrates another example of an output example associated with intelligent JSF composite component generation.

Figure 5:
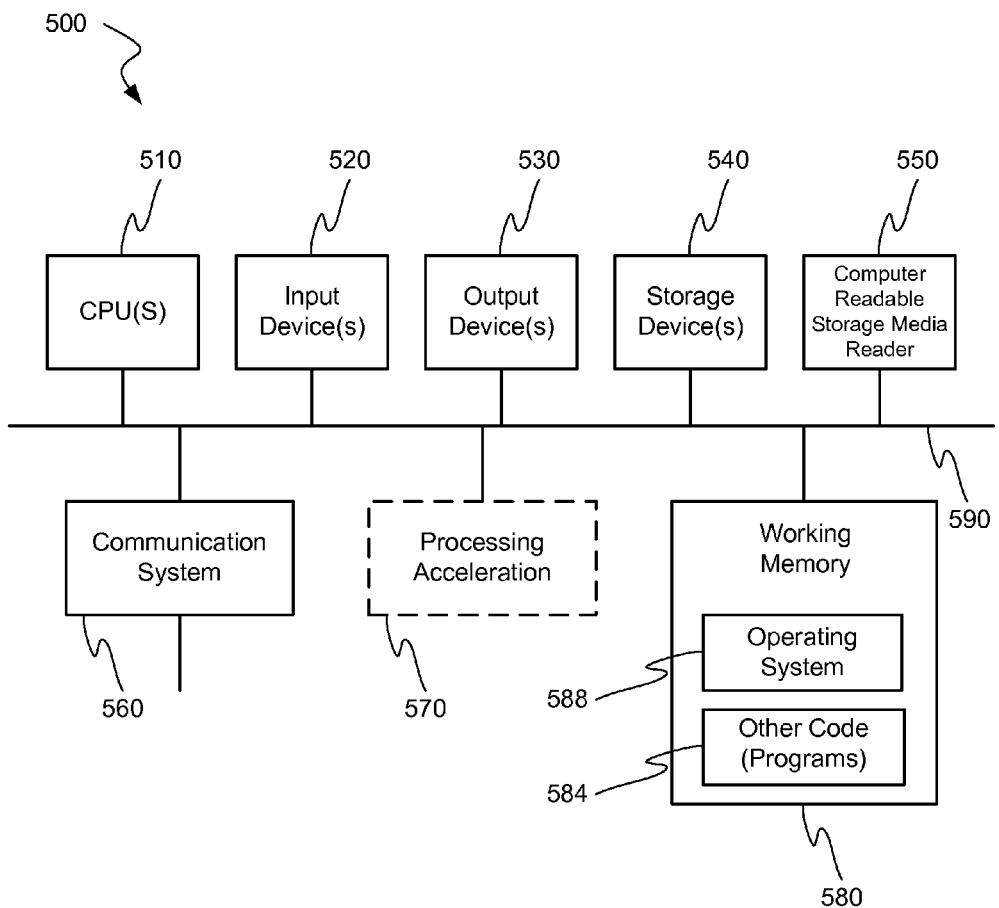
FIG. 5 is a generalized schematic diagram illustrating a computer system, in accordance with various embodiments of the invention.

FIG. 5 is a block diagram illustrating an exemplary computer system 500 in which embodiments of the present invention may be implemented. The computer system 500 is shown comprising hardware elements that may be electrically coupled via a bus 590. The hardware elements may include one or more central processing units 510, one or more input device(s) 520 (e.g., a mouse, a keyboard, etc.), and one or more output device(s) 530 (e.g., a display device, a printer, etc.). The computer system 500 may also include one or more storage device(s) 540. By way of example, storage device(s) 540 may be disk drives, optical storage devices, a solid-state storage device such as a random access memory ("RAM") and/or a read-only memory ("ROM"), which can be programmable, flash-updateable and/or the like.

The computer system 500 may additionally include a computer-readable storage media reader 550, a communication system 560 (e.g., a modem, a network card (wireless or wired), an infra-red communication device, Bluetooth™ device, cellular communication device, etc.), and working memory 580, which may include RAM and ROM devices as described above. In some embodiments, the computer system 500 may also include a processing acceleration unit 570, which can include a digital signal processor, a special-purpose processor, and/or the like.

The computer-readable storage media reader 550 can further be connected to a computer-readable storage medium, together (and, optionally, in combination with storage device(s) 540) comprehensively representing remote, local, fixed, and/or removable storage devices plus storage media for temporarily and/or more permanently containing computer-readable information. The communication system 560 may permit data to be exchanged with a network, system, computer, and/or other components described above.

The computer system 500 may also comprise software elements, shown as being currently located within a working memory 580, including an operating system 588 and/or other code 584. It should be appreciated that alternate embodiments of a computer system 500 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 500 may include code 584 for implementing any or all of the functions of the various elements of the architecture as described herein. For example, software, stored on and/or executed by a computer system such as system 500, can provide the functionality and/or other components of the invention such as those discussed above. Methods implementable by software on some of these components have been discussed above in more detail.

Figure 6:
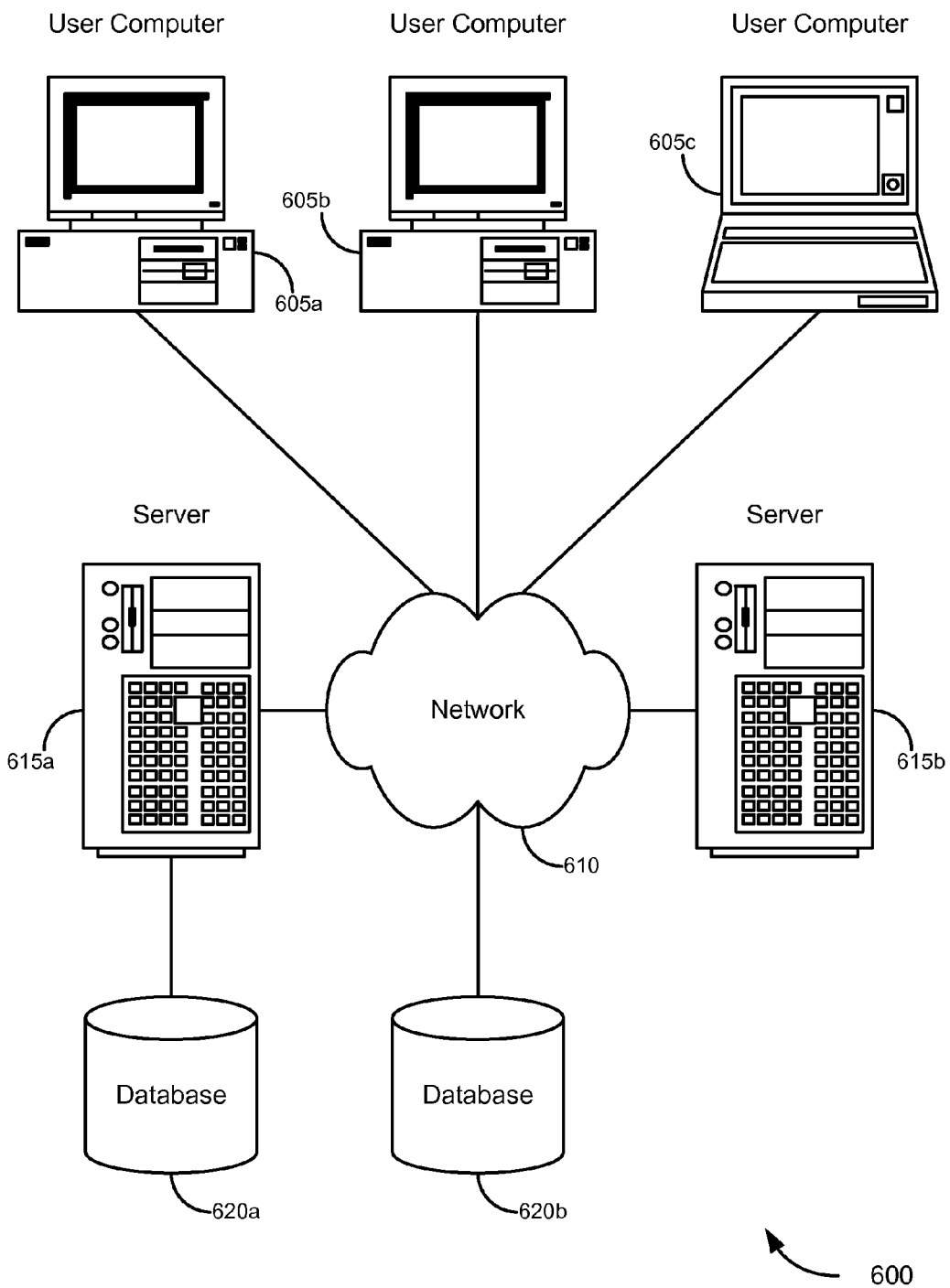
FIG. 6 is a block diagram illustrating a networked system of computers, which can be used in accordance with various embodiments of the invention.

Merely by way of example, FIG. 6 illustrates a schematic diagram of a system 600 that can be used in accordance with one set of embodiments. The system 600 can include one or more user computers 605. The user computers 605 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 605 can also have any of a variety of applications, including one or more applications configured to perform methods of the invention, as well as one or more office applications, database client and/or server applications, and web browser applications. Alternatively, the user computers 605 can be any other electronic device, such as a thin-client computer, Internet-enabled mobile telephone, and/or personal digital assistant (PDA), capable of communicating via a network (e.g., the network 610 described below) and/or displaying and navigating web pages or other types of electronic documents. Although the exemplary system 600 is shown with three user computers 605, any number of user computers can be supported.

Certain embodiments of the invention operate in a networked environment, which can include a network 610. The network 610 can be any type of network familiar to those skilled in the art that can support data communications using any of a variety of commercially available protocols, including without limitation TCP/IP, SNA, IPX, AppleTalk, and the like. Merely by way of example, the network 610 can be a local area network ("LAN"), including without limitation an Ethernet network, a Token-Ring network, and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 615. Each of the server computers 615 may be configured with an operating system, including without limitation any of those discussed above, as well as any commercially (or freely) available server operating systems. Each of the servers 615 may also be running one or more applications, which can be configured to provide services to one or more user computers 605 and/or other server computers 615.

Merely by way of example, one of the server computers 615 may be a web server, which can be used to process requests for web pages or other electronic documents from user computers 605. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 605 to perform methods of the invention.

The server computers 615, in some embodiments, might include one or more application servers, which can include one or more applications accessible by a client running on one or more of the user computers 605 and/or other server computers 615. Merely by way of example, the server computers 615 can be one or more general purpose computers capable of executing programs or scripts in response to the user computers 605 and/or other server computers 615, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 605 and/or another server computer 615. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more server computers 615 can function as a file server and/or can include one or more of the files (e.g., application code, data files, etc.) necessary to implement methods of the invention incorporated by an application running on a user computer 605 and/or another server computer 615. Alternatively, as those skilled in the art will appreciate, a file server can include all necessary files, allowing such an application to be invoked remotely by a user computer 605 and/or server computer 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more database(s) 620. The location of the database(s) 620 is discretionary. Merely by way of example, a database 620*a* might reside on a storage medium local to (and/or resident in) a server computer 615*a* (and/or a user computer 605). Alternatively, a database 620*b* can be remote from any or all of the computers 605, 615, so long as the database can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle™ database, that is adapted to store, update, and retrieve data in response to SQL-formatted commands. The database might be controlled and/or maintained by a database server, as described above, for example.

The invention has now been described in detail for the purposes of clarity and understanding. However, it will be appreciated that certain changes and modifications may be practiced within the scope of the appended claims.

What is claimed:

1. A computer-implemented method of implementing intelligent Java server faces (JSF) composite component generation, the method comprising:
   identifying a plurality of facelet files within a project;
   creating a node tree for each facelet file in the plurality of facelet files;

for each facelet file in the plurality of facelet files:
iterating through the node tree to determine which nodes are tags for composite components;
in response to determining that a plurality of nodes are tags for composite components, computing a hash for each of the plurality of nodes;
generating node lists for each of the plurality of nodes;
adding the plurality of nodes and the hashes to corresponding node lists;
comparing each node list against every other node list from each of the plurality of facelet files;
in response to determining a match among node lists, saving the matched node lists in a composite components data structure;
receiving a selection of one or more node lists from the composite components data structure to be converted to composite components; and
converting the selected one or more node lists to composite components.

2. The computer-implemented method of implementing JSF composite component generation as in claim 1, wherein the identifying of the at least one facelet file within the project includes analyzing file extensions associated with the at least one facelet file.

3. The computer-implemented method of implementing JSF composite component generation as in claim 1, further comprising saving node lists to a data structure.

4. The computer-implemented method of implementing JSF composite component generation as in claim 3, further comprising removing duplicate entries in the data structure.

5. The computer-implemented method of implementing JSF composite component generation as in claim 1, further comprising:
prior to receiving the selection of the node lists to be converted to composite components, requesting a review of the node lists to determine which node lists are to be converted to composite components.

6. The computer-implemented method of implementing JSF composite component generation as in claim 1, wherein the conversion occurs after the at least one facelet file has been created.

7. A system for implementing JSF composite component generation, the system comprising:
a storage device having sets of instructions stored thereon; and
a processor coupled with the storage device, wherein the sets of instructions when executed by the processor, cause the processor to:
identify a plurality of facelet files within a project;
create a node tree for each facelet file in the plurality of facelet files;
for each facelet file in the plurality of facelet files:
iterate through the node tree to determine which nodes are tags for composite components;
in response to determining that a plurality of node are a tags for a composite components, compute a hash for each of the plurality of nodes;
generate node lists for each of the plurality of nodes;
add the plurality of nodes and the hashes to the corresponding node lists;
compare each node list against every other node list from each of the plurality of facelet files;
in response to determining a match among node lists, save the matched node lists in a composite components data structure;
receive a selection of one or more node lists from the composite components data structure to be converted to composite components; and
convert the selected one or more node lists to composite components.

8. The system of implementing JSF composite component generation as in claim 7, wherein the sets of instructions when executed by the processor, further cause the processor to create a node tree structure for the at least one facelet file.

9. The system of implementing JSF composite component generation as in claim 8, wherein the sets of instructions when executed by the processor, further cause the processor to generate child nodes within the node tree structure for each segment in the facelet file.

10. The system of implementing JSF composite component generation as in claim 7, wherein the sets of instructions when executed by the processor, further cause the processor to create a new tag library.

11. The system of implementing JSF composite component generation as in claim 7, wherein the sets of instructions when executed by the processor, further cause the processor to update an existing tag library.

12. The system of implementing JSF composite component generation as in claim 10, wherein the sets of instructions when executed by the processor, further cause the processor to add a tag to the tag library and create composite component files from the node lists and add the composite component files to the tag within the tag library.

13. The system of implementing JSF composite component generation as in claim 7, wherein the sets of instructions when executed by the processor, further cause the processor to:
determine that at least one node list includes only one entry; and
in response to determining that the at least one node list only includes one entry, delete the at least one node list.

14. A non-transitory computer-readable medium having sets of instructions stored thereon which, when executed by a computer, cause the computer to:
identify a plurality of facelet files within a project;
create a node tree for each facelet file in the plurality of facelet files;
for each facelet file in the plurality of facelet files:
iterate through the node tree to determine which nodes are tags for composite components;
in response to determining that a plurality of nodes are tags for composite components, compute a hash for each of the plurality of nodes;
generate node lists for each of the plurality of nodes;
add the plurality of nodes and the hashes to the corresponding node lists;
compare each node list against every other node list from each of the plurality of facelet files;
in response to determining a match among node lists, save the matched node lists in a composite components data structure;
receive a selection of one or more node lists from the composite components data structure to be converted to composite components; and
convert the selected one or more node lists to composite components.

15. The non-transitory computer-readable medium as in claim 14, wherein the sets of instructions when further executed by the computer, cause the computer to save node lists to a data structure.

16. The non-transitory computer-readable medium as in claim 15, wherein the sets of instructions when further executed by the computer, cause the computer to remove duplicate entries in the data structure.

17. The non-transitory computer-readable medium as in claim 14, wherein the sets of instructions when further executed by the computer, cause the computer to:
prior to receiving the selection of the node lists to be converted to composite components, request a review of the node lists to determine which node lists are to be converted to composite components.

18. The non-transitory computer-readable medium as in claim 14, wherein the conversion occurs after the at least one facelet file has been created.

19. The non-transitory computer-readable medium as in claim 14, wherein the sets of instructions when further executed by the computer, cause the computer to create a new tag library.

20. The non-transitory computer-readable medium as in claim 19, wherein the sets of instructions when further executed by the computer, cause the computer to add a tag to the tag library and create composite component files from the node lists and add the composite component files to the tag within the tag library.

* * * * *